April 29, 1958    J. W. STINEMAN, JR    2,832,132
METHOD OF SEALING
Filed Aug. 10, 1955

INVENTOR.
JACOB W. STINEMAN, JR.
BY
AGENT

United States Patent Office 2,832,132
Patented Apr. 29, 1958

2,832,132
METHOD OF SEALING

Jacob W. Stineman, Jr., Villanova, Pa., assignor to Philco Corporation, Philadelphia, Pa., a corporation of Pennsylvania Application August 10, 1955, Serial No. 527,456

3 Claims. (Cl. 29—530)

This invention relates to a method of sealing, and more particularly to an improved method for hermetically sealing housings of the type used to enclose semi-conductor devices or the like, an example of a housing of this type being that used to enclose a germanium crystal diode.

Heretofore in the making of hermetic seals in the art with which this invention is concerned, it has been, at times, the practice to solder-seal certain semi-conductor housings. Frequently while introducing molten solder, for sealing purposes, in openings provided in such housings, air bubbles, or pockets of gas arising, for example, from volatilized constituents of fluxing compounds, have formed in the molten solder and have become entrapped therein upon solidification of the solder. The size of a bubble of this type may be large in proportion to the relatively small opening provided, and it has been determined that random disposition of these gas pockets has, at times, proven deleterious to the making of satisfactory hermetic seals.

It is, therefore, an object of this invention to provide a hermetic solder-seal in which deleterious effects of entrapped gases formed in the solder have been minimized.

It is another object of this invention to provide a novel method for effecting uniform hermetic sealing of a plurality of articles under successive treatment.

It is still another object of this invention to provide an improved method of solder-sealing very small housings, characterized by minimization of failures caused by seal rupture.

To the foregoing general ends preferred practice of this invention contemplates a method of sealing a hollow metal tube by introducing molten solder in an open end portion of the tube and, while maintaining the solder in a fluid state, forcing a member, such as a relatively fine-mesh screen, through the molten solder, thereby carrying any pockets of entrapped gas inward and away from the outer surface of the solder.

While, as set forth in what follows, the invention has broader applicability than the field of semiconductor devices, the following description and accompanying drawings, for exemplary purposes, disclose the invention in terms of a method for sealing each of the hollow pin-ends of a germanium diode housing. Such housings are customarily very small in size; the inside diameter of the pin ends may, for example, be somewhat less than one-tenth inch. Inasmuch as the ends are identical, the ensuing description is concerned with a single pin-end to be sealed.

Now making more detailed reference to the drawings, and initially to Figure 1 thereof, there is shown, by way of example, a diode housing 10 including enclosure 11 and hollow pins 12, said pins being adapted for sealing at open ends 13 by means of the steps of the soldering method hereinafter to be described, and illustrated in Figures 2–5, inclusive. Inasmuch as this invention is not concerned with the structure contained within housing 10, no illustration has been made thereof.

Figure 2:
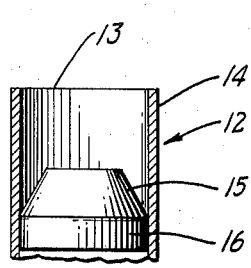
Figure 2 is a fragmentary sectional view of a single end taken along the axis of the housing shown in Figure 1, and prior to soldering.

Referring to Figure 2, there is shown, in detail, an end portion of a single hollow pin 12, which may include a hollow tubular portion 14 constructed of a conductive metal such as, for example, a cobalt-nickel-iron alloy of the kind known in the trade as "Kovar," which may be plated with gold (not shown) or any other highly conductive metal. A stud 15 of frusto-conical configuration has been inserted into the opening 13 of pin 12. This stud may be formed from brass, or any suitable metal, and its outer periphery conforms with the configuration of the hollow portion, or opening 13, of pin 12. Stud 15 is provided with a gasket portion 16, which may advantageously be made of a soft metal such as lead, or the like, and which is force-fitted into the opening 13 of pin 12. If desired, the stud may be provided with a portion extending beyond the gasket. Overlying stud 15 (Figure 3) is molten solder 19 containing gas pockets, or bubbles 18, the presence of which present the problem with which this invention is especially concerned.

Figure 3:
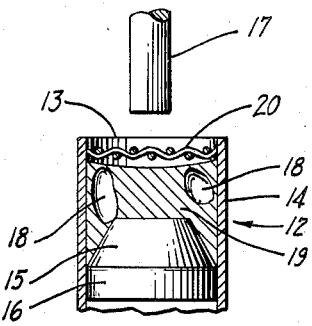
Figure 3 is a view similar to Figure 2, and showing the molten solder, including pockets of entrapped gases, immediately after pouring.
Figure 4:
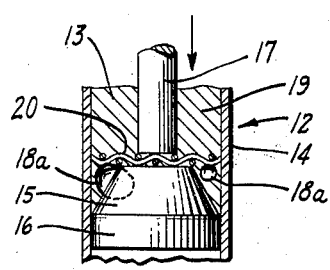
Figure 4 is a view similar to Figure 3, and illustrating the relative positions of the parts, after the screen has been forced through the solder; and, Figure 5 is a view similar to Figure 4, and showing the conditions which obtain after the screen has been forced, and the solder has solidified.
Figure 5:
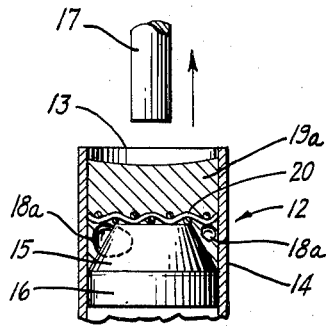

A screen 20 is shown in registry with the open end 13 of pin 12, and overlies the molten solder 19. This screen has a peripheral configuration that conforms with opening 13, and the interior cross-sectional dimensions of tube 14, and may be fabricated either of wire mesh or may comprise a foraminous sheet. Although the screen used in this preferred embodiment is constructed of nickel it is to be understood that other suitable metals may be employed. In screen structure of either aforementioned design, the openings presented by the meshes of the wire screen—or the perforations of a foraminous sheet—must be so dimensioned as to permit ready passage of the molten solder while blocking passage of gas bubbles, as described below. A screen which has been found satisfactory for the purpose is woven from .0026 inch diameter gold-plated nickel wire and has 150 meshes per inch. Referring further to Figure 3, there is shown a retractable plunger 17, of suitable dimensions, which serves as the means to force screen 20 into the solder, as will now be fully explained.

Figure 1:
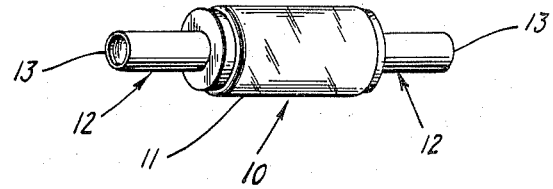
Figure 1 is a perspective view of a housing suited for sealing by the disclosed method.

In practicing the method of my invention, and with particular reference to the sealing of a housing of the kind shown in Figure 1 (it being desired to seal the ends 12 of the housing 10), the stud and gasket (Figure 2) are forced a predetermined distance into tube 14. Molten solder 19 is then introduced within the outer portion of tube 14, and above the stud 15, and also above the bubbles 18 which have formed therein. Screen 20 is then laid upon the surface of solder 19, and plunger 17 is brought to bear upon screen 20 (Figure 4), which is forced to the bottom of solder pool 19 and brought to rest adjacent a portion of stud 15. In this operation, and in particular accordance with the principles of my invention, any gas pockets are forced downward and away from the outwardly exposed surface of the solder to become entrapped as pockets 18a in the annular region bounded by the screen, by sloping portions of the stud, and by the side walls of tube 14. The plunger is then withdrawn (Figure 5) and the solder is permitted to harden, as shown at 19a, into a relatively solid mass. It is again to be emphasized that the screen need not be constructed of wire mesh, but may be made of a foraminous metal sheet having suitably dimensioned apertures.

It will now be appreciated that this invention has provided as its end product a relatively solid plug of solder hermetically sealing the housing. Although gas pockets remain entrapped in the solder, they are disposed in a region well away from the open surface of the solder.

From the foregoing description it will be understood that while the invention provides a method for sealing the hollow pins of housings of the kind described, the principles of the invention are of broader applicability, it being evident that the method of this invention could be utilized in the sealing of elongated, hollow bodies of various cross-sectional configurations, and intended for use in a variety of ways. Also, certain changes can be made in the operating procedure without departing from the principles of the present invention. For example, while it is preferred to position the screen upon the pool of solder, maintaining the solder in a molten condition, under certain circumstances, particularly if there is some delay between the initial introduction of the solder and the use of the screen, it may be desirable to provide for re-melting of the solder and subsequent passage of the screen therethrough. Similarly certain advantages can be obtained by following a procedure in which the solder is introduced within the tube upon the top of the screen and the screen is passed upwardly therethrough, thereby forcing any entrapped gas toward the outside surface of the solder mass. It will be appreciated, however, that the invention contemplates these, and such other, modifications as become within the scope of the appended claims.

I claim:

1. In the art of hermetically sealing a tube-like article through the agency of sealing material which is applied in a molten condition and subsequently permitted to solidify, the steps which comprise: disposing sealing material within said tube-like article to form a sealing mass having considerable depth in the direction of the axis of said article; inserting screen means into said tube-like article, said screen means having a peripheral configuration conforming with the cross-section presented by the article and being disposed in a plane transverse the axis of said article; and passing said screen means through said mass in the direction of said axis and while said mass is in a molten condition, thereby forcing any gas bubbles present in the mass toward a surface of the latter.

2. In the art of hermetically sealing an article having an aperture, through the agency of sealing material which is applied in a molten condition and subsequently permitted to solidify, the steps which comprise: disposing sealing material within the mentioned aperture to form a sealing mass; inserting screen means into said aperture, said screen means having a peripheral configuration conforming with the cross-section presented by the aperture and being disposed in a plane transverse the axis of the aperture; and passing said screen means through said mass in the direction of the mentioned axis and while said mass is in a molten condition, thereby forcing any gas bubbles present in the mass toward a surface of the latter.

3. In the art of forming a hermetic seal through the agency of a sealing material which is applied in a molten condition to a predetermined region to be sealed and subsequently solidifies, the steps which comprise: applying the sealing material to the region to be sealed to form a sealing mass; disposing screen means substantially in a plane directly confronting and extending across said region to be sealed; and moving said screen means while so positioned through said mass in a direction transverse the mentioned plane while maintaining the mass in molten condition, thereby forcing any gas bubbles present in the mass toward a surface of the latter.

References Cited in the file of this patent

UNITED STATES PATENTS

| | | |
|---|---|---|
| 1,956,233 | Braun | Apr. 24, 1934 |
| 1,991,582 | Sterling | Feb. 19, 1935 |
| 2,207,461 | Kemp | July 9, 1940 |
| 2,265,352 | Corbin | Dec. 9, 1941 |
| 2,457,599 | Pessel | Dec. 28, 1948 |
| 2,485,444 | Hofberg | Oct. 18, 1949 |
| 2,583,438 | Nieman | Jan. 22, 1952 |
| 2,662,500 | Fort | Dec. 15, 1953 |
| 2,694,852 | Rogers | Nov. 23, 1954 |